J. T. ASBURY.
STRAW CUTTER.
No. 9,984. Patented Sept. 6, 1853.
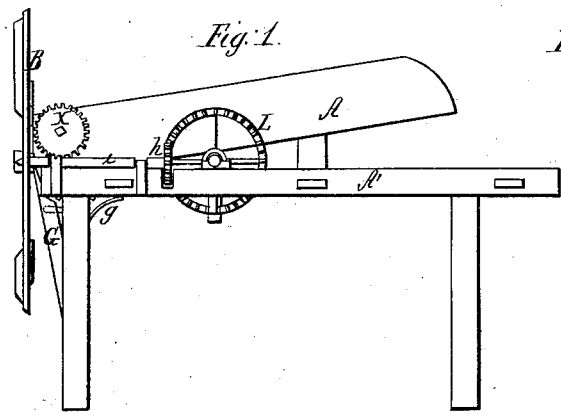
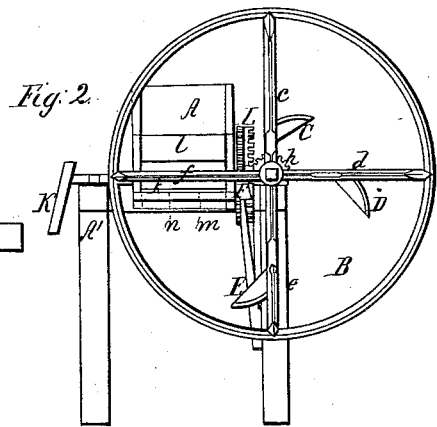
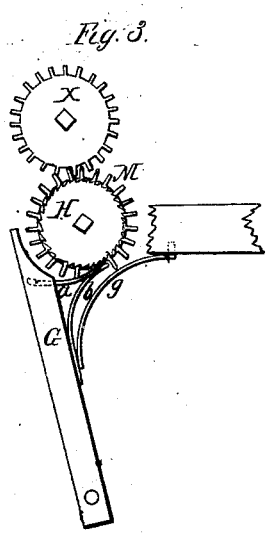
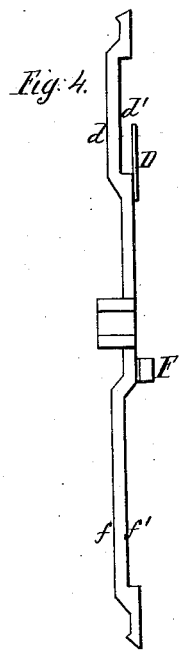
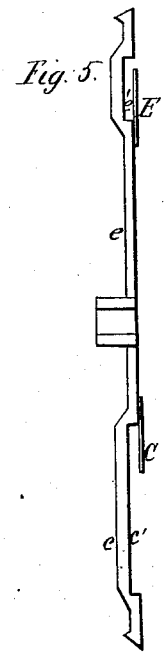

UNITED STATES PATENT OFFICE.

JAMES T. ASBURY, OF TAYLORSVILLE, NORTH CAROLINA.

STRAW-CUTTER.

Specification of Letters Patent No. 9,984, dated September 6, 1853.

*To all whom it may concern:*

Be it known that I, JAMES T. ASBURY, of Taylorsville, in the county of Alexander and State of North Carolina, have invented a new and useful Improvement in Straw-Cutters; and I do hereby declare that the following is a full, clear, and exact description of the construction and operation of the same, reference being had to the annexed drawings, forming part of this specification, in which—

Figure 1 is a side elevation of the straw cutter. Fig. 2 is an end elevation. Fig. 3 is a side elevation of the feeding apparatus. Fig. 4 is a side elevation of the radial arms $d$ and $f$ showing the recesses $d'$ and $f'$, and Fig. 5 is a similar view showing the arms $c$ and $e$ and recesses $c'$ and $e'$.

Similar letters in the several figures refer to the same parts of the machine.

The nature of my invention consists in so arranging the cutting knives that one third of the feed shall be cut by each of the knives as they successively come in contact with the straw, the knives being properly fastened to three radial arms of a vertical wheel to effect the cut as described; the fourth arm of the wheel being furnished with a cam for moving the feeding apparatus; the arms being also constructed with recesses for permitting each to pass over the protruding portion of the uncut straw while its respective knife is making its cut.

In the drawing A is the cutter box, and A' the frame.

B is a vertical wheel having four radial arms $c\ d\ e\ f$, the first three having the knives C, D, E secured to them, and the latter furnished with the cam F for moving the feeding apparatus, which consists of the lever G, ratchet H, dog $a$, springs $b$ and $g$ and rollers $k$ and $l$. The knives C, D, E are placed upon the radial arms $c$, $d$, $e$ so that the cut of each commences where that of the preceding one ended, the arms having the recesses $c'\ d'\ e'\ f'$ to allow their passing over the projecting uncut straw while their cutting knives are performing their part of the operation.

The operation of my improved straw cutter is as follows:—Motion is communicated to the machine by means of the crank K revolving the cog wheel L, and through it the wheel B by reason of the pinion $h$ of the shaft $i$ meshing into the wheel L. The cam F striking against the upper extremity of the lever G, presses the dog $a$ back, carrying the ratchet H and cog wheel M forward, causing the horizontal shafts $k$ and $l$ to revolve, and work the straw forward a sufficient distance for the feed, the arm $f$ passing over the projecting feed by reason of the recess $f'$. As the wheel B continues to revolve the heel of the knife C comes in contact with the straw nearest the axis of the wheel, making a cut from heel to point of one third the whole feed, the arm $c$ passing over the uncut portion because of the recess $c'$. The wheel continuing its revolution the knife D cuts in like manner another third of the feed, from $m$ to $n$, the remaining uncut third passing through the recess $d'$, after which it is met by the knife E which passes through it from heel to point as the knives C and D have previously done with their respective thirds, and the cut is complete, after which the cam F comes again in contact with the lever G causing as above described the rollers $k$ and $l$ to push forward another feed which is cut in like manner by the revolution of the wheel B.

The great advantage of this cutter consists in the division of the feed into three portions, cut separately and in succession, thereby greatly facilitating the cutting by preventing the sudden shocks consequent to other arrangements; and also in the mode of feeding, regulated by the revolution of the cutting wheel so that the proper quantity of straw for the cut is pushed forward at each revolution of the wheel, and further in the construction of the radial arms by which the wheel is enabled to revolve so as to permit the operation of the knives without any interference of the arms with the projecting straw.

What I claim as my invention and desire to secure by Letters Patent, is—

The combination of the three cutting knives C, D, E as described, with the recessed arms $c$, $d$, $e$, $f$ whereby one third of the feed of straw is cut successively by each knife, the protruding uncut portion passing through the recesses $c'$, $d'$, $e'$, $f'$ in the arms during the operation, substantially as specified.

In testimony whereof I have hereunto signed my name before two subscribing witnesses.

JAMES T. ASBURY

Witnesses:
 W. W. FOOTE,
 J. M. CARSON.